United States Patent [19]

Miyao et al.

[11] Patent Number: 4,707,645
[45] Date of Patent: Nov. 17, 1987

[54] SINGLE-PHASE BRUSHLESS MOTOR

[75] Inventors: Osami Miyao, Sagamihara; Manabu Shiraki, Yamato; Masayuki Ohsaka, Sagamihara, all of Japan

[73] Assignee: Shicoh Engineering Co., Ltd., Yamato, Japan

[21] Appl. No.: 924,902

[22] Filed: Oct. 30, 1986

[30] Foreign Application Priority Data

Jul. 25, 1986 [JP] Japan ................ 61-176337

[51] Int. Cl.$^4$ .......................................... H02K 23/00
[52] U.S. Cl. ................... 318/254; 310/68 R; 310/268
[58] Field of Search ........... 318/254 R, 254 A, 138; 310/68 R, 67, 268, 68 C

[56] References Cited

U.S. PATENT DOCUMENTS

| | | | |
|---|---|---|---|
| 3,867,656 | 2/1975 | Mitsui et al. | 310/268 X |
| 4,211,963 | 7/1980 | Müller | 310/268 X |
| 4,242,608 | 12/1980 | Ishigaki et al. | 310/68 R |
| 4,322,666 | 3/1982 | Müller | 310/268 X |
| 4,481,440 | 11/1984 | Müller | 310/268 |
| 4,531,079 | 7/1985 | Müller | 310/68 R X |
| 4,547,713 | 10/1985 | Langley et al. | 318/254 |
| 4,574,211 | 3/1986 | Müller et al. | 318/254 X |
| 4,651,041 | 3/1987 | Shiraki et al. | 310/268 X |

Primary Examiner—Donovan F. Duggan
Attorney, Agent, or Firm—Wegner & Bretschneider

[57] ABSTRACT

A single-phase brushless motor which can rotate smoothly with minimized torque ripples without generating a cogging torque. A magnet rotor of the motor has north and south magnetic pole and non-magnetized zones successively formed in ranges thereof each having an angular width of 120 degrees in electrical angle, and a stator armature is mounted in an opposing relationship to the magnet rotor and includes an annular stator yoke on which a same number of stator coils for each of 3 phases are wound in a troidal configuration and successively located in an angularly spaced relationship by an electrical angle of 120 degrees. A position detecting element is located for detecting a magnetic pole or non-magnetized portion of the magnet rotor, and in response to signals successively developed from the position detecting element during rotation of the magnet rotor, an energization controlling circuit successively energizes the stator coils to rotate the magnet rotor in a predetermined direction.

1 Claim, 11 Drawing Figures

SINGLE-PHASE BRUSHLESS MOTOR

BACKGROUND OF THE INVENTION

1. Field of the Invention

This invention relates to a single-phase brushless motor which is well adapted for a spindle motor for a floppy disk drive, a motor for audio and video appliances, and a motor for an axial-flow fan.

2. Description of the Prior Act

A brushless motor is used in a variety of appliances owing to its characteristics that it makes little noises and has a long life because it has neither brush nor commutator in addition to its characteristics as a dc motor. In a brushless motor, an electronic circuit is used for switching energization of armature coils of the motor and includes, for applicable phases of the motor, a corresponding number of driving circuits each including a position detecting element. Accordingly, it is a drawback that as the number of phases increases, the production cost increases accordingly due to such position detecting elements.

Therefore, inexpensive appliances such as axial-flow fans commonly employ a single-phase brushless motor which includes a driving circuit designed for a single-phase and hence can be produced at a low cost.

Such a single-phase brushless motor has a drawback that it cannot start itself if it stops at a dead point.

Therefore, a conventional single-phase brushless motor is normally provided with special means such as a cogging torque generating member such as an iron bar located in an air gap or a special stator armature providing a slanted or sloped air gap for generating a cogging torque to assure self-starting of a rotor of the motor.

Such conventional single-phase brushless motors utilizing a cogging torque as described above have drawbacks that smooth rotation cannot be attained due to generation of a cogging torque and that they are not easy to assemble and hence are expensive. Besides, the brushless motor employing an iron bar has a relatively large number of parts while the brushless motor employing a special stator armature cannot provide a high turning torque.

SUMMARY OF THE INVENTION

It is an object of the present invention to provide a single-phase brushless motor which generates little or substantially no cogging torque and can be rotated smoothly with minimized torque ripples.

It is another object of the invention to provide a single-phase brushless motor which can be rotated smoothly and is simple in construction, easy to assemble and low in production cost.

It is a further object of the invention to provide a single-phase brushless motor which can start itself with a simplified construction without provision of a special cogging generating means and can generate a higher torque than a conventional single-phase brushless motor.

In order to attain the objects, according to the present invention, there is provided a single-phase brushless motor, comprising: a magnet rotor having n (n is an integer equal to or greater than (1) north magnetic pole zone or zones having an angular width of 120 or about 120 degrees in electrical angle, n south magnetic pole zone or zones having an angular width of 120 or about 120 degrees in electrical angle, and n non-magnetized or substantially non-magnetized zone or zones having an angular width of 120 or about 120 degrees; a stator armature mounted in an opposing relationship to said magnet rotor with an air gap left therebetween, said stator armature including an annular stator yoke, n armature coil or coils for the phase u each including a conductor wound in a troidal configuration and located at an angular same phase position or positions of about u·360 degrees (u is an integer equal to or greater than 1) in electrical angle on said annular stator yoke, n armature coil or coils for the phase v each including a conductor wound in a troidal configuration and located at an angular same phase position or positions on said stator yoke spaced by an angular distance of about v·360+120 degrees (v is an integer equal to or greater than 1) from the position of one of said armature coils for the phase u at the angular position of 360 degrees, and n armature coil or coils for a phase w each including a conductor wound in a troidal configuration and located at an angular same phase position or positions on said stator yoke spaced by an angular distance of about w·360+240 degrees (w is an integer equal to or greater than 1) from the position of the one armature coil for the phase u; a single position detecting element for detecting a magnetic pole of said magnet rotor; and an electric circuit for energizing said armature coils such that when said position detecting element detects one of said north magnetic pole zone or zones of said magnet rotor, said n armature coil or coils for the phase u at the same phase positions are energized over a range of an angle of 120 or about 120 degrees in electrical angle, and when said position detecting element detects one of said south magnetic pole zone or zones of said magnet rotor, said n armature coil or coils for the phase v at the same phase positions are energized over another range of an angle of 120 or about 120 degrees in electrical angle, but when said position detecting element detects one of said non-magnetized or substantially non-magnetized zone or zones or any other non-magnetized portion, said n armature coil or coils for the phase w at the same phase positions are energized over a further range of an angle of 120 or about 120 degrees in electrical angle.

DESCRIPTION OF THE PREFERRED EMBODIMENTS

Figure 1:
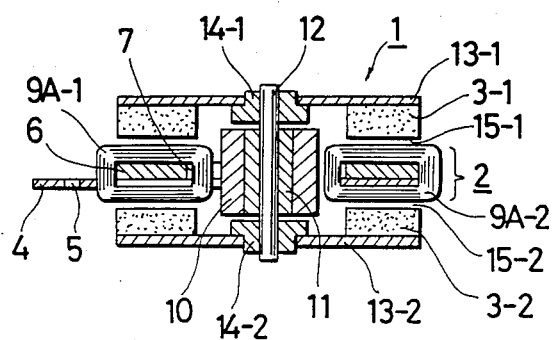
FIG. 1 is a vertical sectional view of a flattened single-phase coreless brushless motor according to an embodiment of the present invention.

Referring first to FIG. 1, there is illustrated a flattened single-phase coreless brushless motor according to an embodiment of the present invention. The flattened single-phase coreless brushless motor generally denoted at 1 includes a stator armature 2 and a pair of magnet rotors 3-1, 3-2 mounted for rotation relative to and in a face-to-face opposing relationship above and below the stator armature 2. The stator armature 2 includes a printed circuit board 4 having a perforation 5 formed at an end thereof so that the stator armature 2 may be secured to a stationary motor body not shown by means of a screw which extends through the perforation 5 though not shown. An annular stator yoke 6 is applied to the printed circuit board 4 by a bonding agent with a perforation 7 formed therein being registered with a perforation formed in the printed circuit board 4 and is additionally secured to the printed circuit board 4 by means of a fastening screw not shown made of a non-magnetic material. A surface of the stator yoke 6 is processed for insulation in order to prevent electrical short-circuiting thereof with armature coils 9A-1, 9A-2, 9A-3, 9B-1, 9B-2, 9B-3, 9C-1, 9C-2, 9C-3 which are wound in a troidal configuration on the stator yoke.

A bearing holder 10 is secured to the printed circuit board 4, and a rotary shaft 12 is supported for rotation on the bearing holder 10 by means of a bearing 11 such as, for example, an oilless metal bearing installed in the bearing holder 10. A pair of rotor yokes 13-1, 13-2 are secured to opposite ends of the rotary shaft 12 by way of a pair of hub members 14-1, 14-2, respectively, and the magnet rotors 3-1, 3-2 are located on inner faces of the rotor yokes 13-1, 13-2, respectively, so that the magnet rotors 3-1, 3-2 may rotate relative to the stator armature 2.

Figure 2:
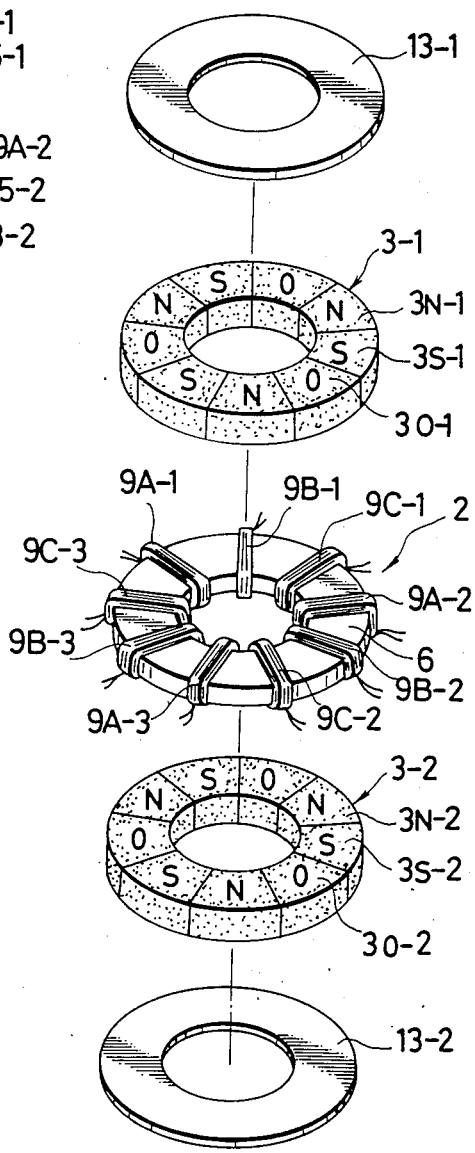
FIG. 2 is a fragmentary perspective view of main part of the brushless motor of FIG. 1.

FIG. 2 shows a perspective view of the magnet rotors 3-1, 3-2 and the stator armature 2 as viewed obliquely from above. In this instance, the motor may include only one magnet rotor located in an opposing relationship to one of opposite faces of the stator armature 2, but in order to obtain a higher turning torque, an additional second magnet rotor is preferably provided in an opposing relationship to the other face of the stator armature 2 as seen in FIG. 1. It is to be noted that where the motor includes two magnet rotors, opposing magnetic poles or pole zones of the magnet rotors must necessarily have same polarities with the stator armature 2 interposed therebetween.

Referring to FIG. 2, the magnet rotors 3-1, 3-2 are each formed as a 9-pole magnet rotor having, at a face thereof opposing to the stator armature 2, 3 N (north) magnetic poles or pole zones 3N-1, 3N-2 having an angular width of 120 degrees in electrical angle, 3 S (south) magnetic poles or pole zones 3S-1, 3S-2 having an angular width of 120 degrees in electrical angle, and 3 non-magnetized zones 3O-1, 3O-2 having an angular width of 120 degrees in electrical angle. The N and S pole and non-magnetized zones 3N-1, 3S-1, 3O-1 or 3N-2, 3S-2, 3O-2 are arranged successively as seen in FIG. 2. It is to be noted that an electrical angle of 120 degrees corresponds to a mechanical angle of 40 degrees in the motor 1 of the present embodiment. It is also to be noted that the reason why the magnet rotors 3-1, 3-2 are each called a 9-pole magnet rotor above is that here the non-magnetized zones 3O-1, 3O-2 are each considered a kind of magnetic pole. It is further to be noted that the sequential order of the magnetic pole zones including the non-magnetized zones 3O-1, 3O-2 is not limited to such as shown in FIG. 2 and may be modified in any manner so far as the magnetic poles are formed in sequential successive order.

It is to be additionally noted that while the magnet rotors 3-1, 3-2 have 9 magnetic poles, the single-phase brushless motor 1 can rotate even if it is modified such that the magnet rotors 3-1, 3-2 thereof are formed otherwise as 3 pole rotors each having only one N magnetic pole, only one S magnetic pole and only one non-magnetized zone. In the present embodiment, however, the magnet rotors 3-1, 3-2 have 9 magnetic poles in order that the brushless motor 1 may generate a much higher turning torque and may rotate smoothly with reduced torque ripples using a greater number of armature coils 9A-1, 9A-2, ..., 9C-3.

The stator armature 2 is mounted on the stationary motor body in an opposing relationship to the magnet rotors 3-1, 3-2 with axial air gaps 15-1, 15-2 left therebetween as seen in FIG. 1. The stator armature 2 will not be described with reference to FIGS. 2 and 3.

Figure 3:
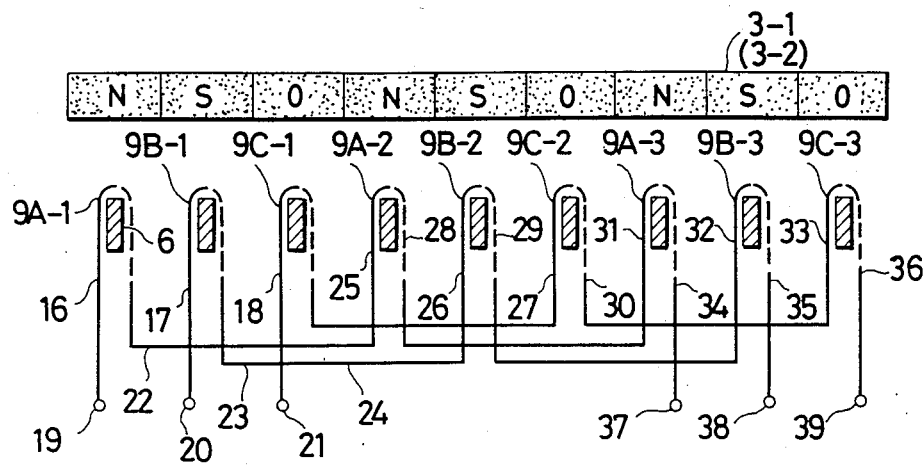
FIG. 3 is a developed view of a magnet rotor and a stator armature of the motor of FIG. 1.

It is to be noted that a hatched block denoted at 6 in FIG. 3 indicates a portion of the annular stator yoke 6 of FIG. 2, and broken line segments of the armature coils, 9A-1, 9A-2, 9A-3, 9B-1, 9B-2, 9B-3, 9C-1, 9C-2, 9C-3 indicate portions of the armature coils underlying the stator yoke 6.

Referring to FIGS. 2 and 3, the armature coils 9A-1, 9A-2, 9A-3 are wound at same phase positions on the stator yoke 6, the armature coils 9B-1, 9B-2, 9B-3 are wound at other same phase positions, and the armature coils 9C-1, 9C-2, 9C-3 are wound at further same phase positions on the stator yoke 6. The armature coil 9A-1 for the phase u-1 includes a large number of turns of a conductor wound in a troidal configuration and is located at an angular position of n·360 degrees (here, n=1) on the annular stator yoke 6. The armature coil 9A-2 for the phase u-2 includes a large number of turns of a conductor wound in a troidal configuration and is located at a same phase position with the armature coil 9A-1 on the stator yoke 6 which is an angular position spaced by an angle of n·360 degrees (here, n=2) in electrical angle, that is, 120 degrees in mechanical angle, from the position of the u-1 phase armature coil 9A-1 in one circumferential direction. The armature coil 9A-3 for the phase u-3 includes a large number of turns of a conductor wound in a troidal configuration and is located at another same phase position with the armature coil 9A-1 on the stator yoke 6 which is an angular position spaced by an angle of n·360 degrees (here, n=3) in electrical angle, that is, 240 degrees in mechanical angle, from the position of the u-1 phase armature coil 9A-1 in the one circumferential direction. The armature coil 9B-1 for the phase v-1 includes a large number of turns of a conductor wound in a troidal configuration and is located at an angular position on the stator yoke 6 spaced by an angle of n·360+120 degrees (here, n=1) in electrical angle, that is, 40 degrees in mechanical angle, from the position of the u-1 phase armature coil 9A-1 in the one circumferential direction. The armature coil 9B-2 for the phase v-2 includes a large number of turns of a conductor wound in a troidal configuration and is located at an angular position on the stator yoke 6 spaced by an angle of n·360+120 degrees (here, n=2) in electrical angle, that is, 160 degrees in mechanical angle, from the position of the u-1 phase armature coil 9A-1 in the one circumferential direction. The armature coil 9B-3 for the phase v-3 includes a large number of turns of a conductor wound in a troidal configuration and is located at an angular position on the stator yoke 6 spaced by an angle of n·360+120 degrees (here, n=3) in electrical angle, that is, 280 degrees in mechanical angle, from the position of the u-1 phase armature coil 9A-1 in the one circumferential direction. The armature coil 9C-1 for the phase w-1 includes a large number of turns of a conductor wound in a troidal configuration and is located at an angular position on the stator yoke 6 spaced by an angle of n·360+240 degrees (here, n=1) in electrical angle, that is, 90 degrees in mechanical angle, from the position of the u-1 phase armature coil 9A-1 in the one circumferential direction. The armature coil 9C-2 for the phase w-2 includes a large number of turns of a conductor wound in a troidal configuration and is located at an angular position on the stator yoke 6 spaced by an angle of n·360+240 degrees (here, n=2) in electrical angle, that is, 200 degrees in mechanical angle, from the position of the u-1 phase armature coil 9A-1 in the one circumferential direction. The armature coil 9C-3 for the phase w-3 includes a large number of turns of a conductor wound in a troidal configuration and is located at an angular position on the stator yoke 6 spaced by an angle of n·360+240 degrees (here, n=3) in electrical angle, that is, 320 degrees in mechanical angle, from the position of the u-1 phase armature coil 9A-1 in the one circumferential direction.

One terminals 16, 17, 18 of the armature coils 9A-1, 9B-1, 9C-1 for the phases u-1, v-1, w-1 are connected to terminals 19, 20, 21, respectively. The other terminals 22, 23, 24 of the armature coils 9A-1, 9B-1, 9C-1 are connected to one terminals 25, 26, 27 of the armature coils 9A-2, 9B-2, 9C-2, respectively. The other terminals 28, 29, 30 of the armature coils 9A-2, 9B-2, 9C-2 are connected to one terminals 31, 32, 33 of the armature coils 34, 35, 36 of the armature coils 9A-3, 9B-3, 9C-3 are connected to terminals 37, 38, 39, respectively. The terminals 19, 20, 21, 37, 38, 39 are connected to an energization controlling circuit 40 shown in FIG. 4.

Figure 4:
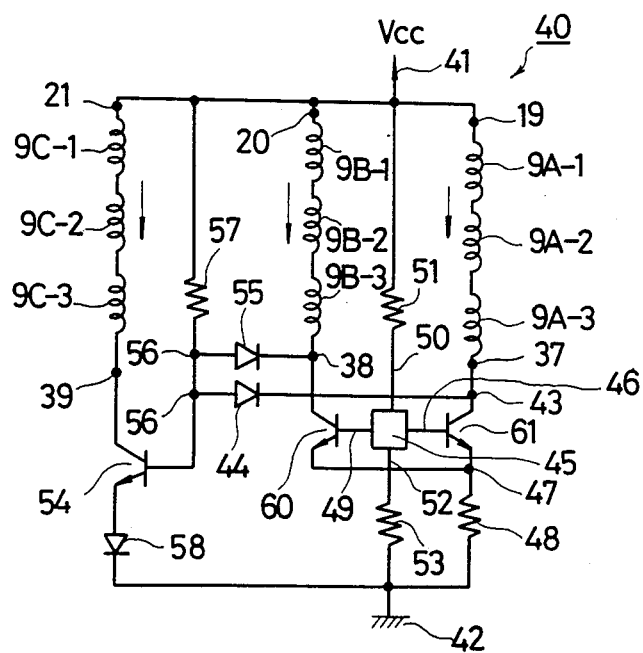
FIG. 4 is a circuit diagram of an energization controlling circuit for the motor of FIG. 1.

FIG. 4 shows an example of energization controlling circuit 40 which can be applied to the single-phase brushless motor acccording to the present invention. Referring to FIG. 4, the energization controlling circuit 40 is connected between a positive power supply 41 and the ground 42. The terminals 19, 20, 21 are connected in common to the positive power supply 41. The terminal 19 is connected to an end of a serial circuit of the armature coils 9A-1, 9A-2, 9A-3 for the phases u-1, u-2, u-3. The terminal 20 is connected to an end of a serial circuit of the armature coils 9B-1, 9B-2, 9B-3 for the phases v-1, v-2, v-3. The terminal 21 is connected to an end of a serial circuit of the armature coils 9C-1, 9C-2, 9C-3 for the phases w-1, w-2, w-3. The other terminal of the armature coil 9A-3 is connected to the collector of a transistor 61 via the terminal 37. The other terminal of the armature coil 9B-3 is connected to the collector of another transistor 60 via the terminal 38. The other terminal of the armature coil 9C-3 is connected to the collector of a further transistor 54 via the terminal 39. A junction point 43 between the collector of the transistor 61 and the terminal 37 is connected to the cathode of a diode 44. The base of the transistor 61 is connected to an output terminal 46 of a Hall effect element 45 employed as a position detecting element. The emitters of the transistors 61 and 60 are connected in common at a terminal 47 and to the ground 42 via an emitter resistor 48. The other output terminal 49 of the Hall effect element 45 is connected to the base of the transistor 60.

A positive power terminal 50 of the Hall effect element 45 is connected to the positive power supply 41 via a resistor 51, and a negative power terminal 52 is connected to the ground 42 via a resistor 53. The base of the transistor 54 is connected to the positive power supply 41 via a junction point 56 between the anodes of the diodes 44 and 55 and via a resistor 57. The cathode of the diode 55 is connected to the junction point 38. The emitter of the transistor 54 is connected to the anode of a diode 58. The cathode of the diode 58 is connected to the ground 42.

It is to be noted that while in the circuit configuration of FIG. 4 the three groups each including the three armature coils 9A-1, 9A-2 and 9A-3, 9B-1, 9B-2 and 9B-3, and 9C-1, 9C-2 and 9C-3 are each constituted as a serial circuit, naturally the three armature coils in each group may otherwise be connectd in a parallel circuit.

Figure 5A:
FIGS. 5(a) to 5(d) are timing charts illustrating turning torques generated in the motor of FIG. 1.

The energization controlling ciruit 40 has such a construction as described above. Here, it is assumed that the Hall effect element 45 is located at a same phase position with the armature coil 9A-1 for the phase u-1 and the magnet rotors 3-1, 3-2 rotate in a predetermined direction relative to the stator armature 2. Thus, if the Hall effect element 45 detects an N magnetic pole zone 3N-1 (or 3N-2) of the magnet rotor 3-1 (or 3-2) upon starting of rotation of the magnet rotors 3-1, 3-2, the transistor 61 is rendered conductive in response to a signal delivered thereto via the output terminal 46 of the Hall effect element 45. As a result, electric current will flow through the armature coils 9A-1, 9A-2, 9A-3 in a direction shown by an appended arrow mark in FIG. 4 so that, as seen from a hatched portion of the timing chart of FIG. 5(a), a turning torque 62u for the phase u will be generated over a range of an electrical angle of 120 degrees from an angular position of u·360 degrees (u is an integer equal to or greater than 1) in accordance with the Fleming's left-hand rule. Accordingly, the magnet rotors 3-1, 3-2 will be rotated over a range of an electrical angle of 120 degrees in the predetermined direction.

Figure 5B:
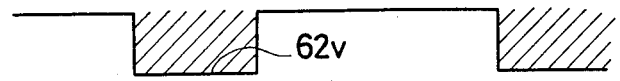

After rotation of the magnet rotors 3-1, 3-2 by an electriccal angle of 120 degrees, the Hall effect element 45 will now detect an S pole zone 3S-1 (or 3S-2) of the magnet rotor 3-1 (or 3-2). Consequently, the Hall effect element 45 now delivers an output signal from its output terminal 49 to render the transistor 60 conductor. As a result, the armature coils 9B-1, 9B-2, 9B-3 are energized by electric current flow in a direction of an appended arrow mark so that, as seen from a hatched portion of the timing chart of FIG. 5(b), a turning torque 62v for the phase v will be generated in the predetermined direction over a range of an electrical angle of 120 degrees from an angular position spaced by an angle of v·360+120 (v is an integer equal to or greater than 1) degrees in electrical angle from the position of the armature coil 9A-1 for the u-1 phase in accordance with the Fleming's left-hand rule in a similar manner as described above. Consequently, the magnet rotors 3-1, 3-2 are further rotated over another angle of 120 degrees in electrical angle from the position specified as above.

Figure 5C:
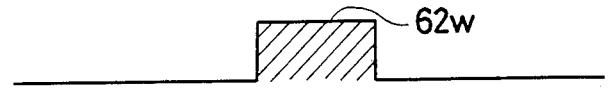

Thus, the Hall effect element 45 now detects a non-magnetized zone 3O-1 (or 3O-2) of the magnet rotor 3-1 (or 3-2). Consequently, the Hall effect element 50 will now provide no output signal from the output terminals 46, 49 so that neither of the armature coils 9A-1, 9A-2, 9A-3, 9B-1, 9B-2, 9B-3 is energized and hence no torque is generated thereby. In this instance, however, since the potential at the junction point 56 is at a high level, that is, the high voltage of the positive power supply 41 is applied to the base of the transistor 54 via the resistor 57 and the junction point 56, the transistor 54 is rendered conductive. As a result, the armature coils 9C-1, 9C-2, 9C-3 are energized by electric current flow in a direction of an appended arrow mark so that, as seen from a hatched portion of the timing chart of FIG. 5(c), a turning torque 62w for the phase w will be generated in the predetermined direction over a range of an electrical angle of 120 degrees from an angular position spaced by an angle of w·360+240 (w is an integer equal to or greater than 1) degrees in electrical angle from the position of the armature coil 9A-1 for the u-1 phase. Consequently, the magnet rotors 3-1, 3-2 are rotated over a further angle of 120 degrees in electrical angle from the position specified as above.

Consequently, the Hall effect element 45 now detects another N magnetic pole 3N-1 (or 3N-2) of the magnet rotor 3-1 (or 3-2) as in the initial stage described above. Accordingly, the transistor 61 is rendered conductive in a similar manner by the Hall effect element 45 to cause a turning torque to be generated. Hereafter, the same series of operations described above will be repeated to continue rotation of the motor.

Figure 5D:
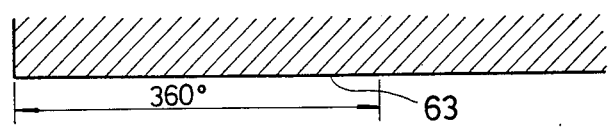

Thus, as shown by a hatched portion of the timing chart of FIG. 5(d), a composite turning torque 63 is generated uniformly over a range of an electrical angle of 360 degrees. Accordingly, the magnet rotors 3-1, 3-2 can continuously rotate over a range of an electrical angle of 360 degrees.

It is to be noted that while the single-phase brushless motor described hereinabove has an axial air gap structure, it may otherwise be formed as a cup-shaped single-phase brushless motor having a radial air gap structure.

It is also to be noted while the non-magnetized zones 3O-1, 3O-2 are formed by leaving part of the magnet rotors 3-1, 3-2 not magnetized, they are not limited to such specific non-magnetized portions but may be substantially non-magnetized portions.

Figure 6:
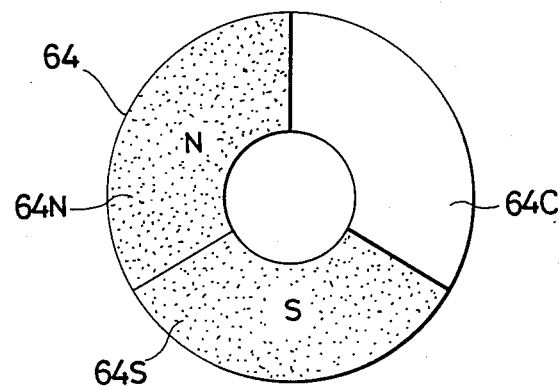
FIGS. 6 to 8 are schematic bottom plan views illustrating different magnet rotors which can be used in a single-phase brushless motor of the present invention.

For example, referring to FIG. 6, a magnet rotor 64 may have a cutaway portion 64C formed therein by cutting away a portion thereof over a range of an electrical angle of 120 degrees. Thus, the magnet rotor 64 is formed as a 3-pole magnet rotor having an N magnetic pole zone 64N, an S magnetic pole zone 64S, and a substantially non-magnetized zone provided by the cutaway portion 64C of the magnet rotor 64.

Figure 7:
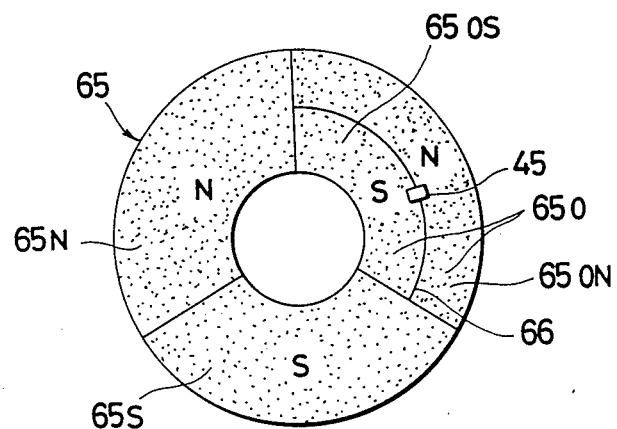

FIG. 7 is a bottom plan view of a different magnet rotor 65. The magnet rotor 65 of FIG. 7 has an N pole zone 65N formed by magnetization in a range thereof extending over an electrical angle of 120 degrees, an S pole zone 65S formed by magnetization in an adjacent contiguous range also extending over an electrical angle of 120 degrees, and a substantially non-magnetized zone 65O formed by magnetization over the remaining range extending over an electrical angle of 120 degrees. The substantially non-magnetized zone 65O can be formed by forming an N pole zone 65ON and an S pole zone 65OS in a circumferentially parallel relationship with a suitable radial width over the remaining range of an electrical angle of 120 degrees by a suitable method. The substantially upon-magnetized zone 65O shown in FIG. 7 is formed by magnetizing an outer half of the magnet rotor 65 into the N pole zone 65ON and an inner half into the S pole zone 65OS. The substantially non-magnetized zone 65O having such a construction as described just above acts as such because the N and S magnetic poles of the N pole zone 65ON and the S pole zone 65OS act to cancel each other.

In this instance, a position detecting element 45 need be located such that it may oppose to a boundary 66 between the N pole zone 65ON and the S pole zone 65OS.

Figure 8:
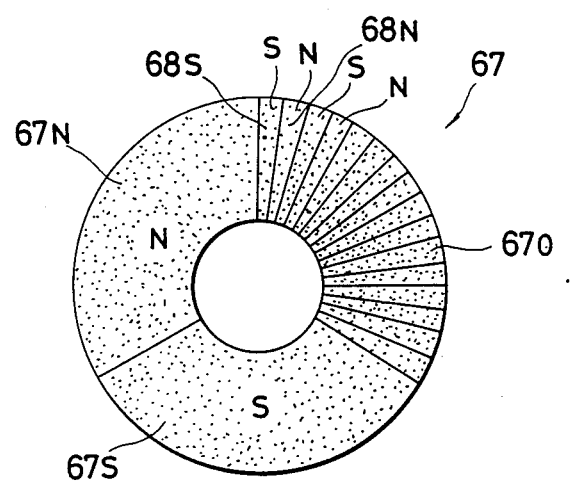

FIG. 8 shows a bottom plan view of a further different magnet rotor 67. The magnet rotor 67 shown in FIG. 8 has an N pole zone 67N and an S pole zone 67S extending over adjacent contiguous ranges each of an electrical angle of 120 degrees, and a substantially non-magnetized zone 67O formed in the remaining range extending over an electrical angle of 120 degrees by magnetizing the remaining range of the magnet rotor 67 to form N pole zones 68N and S pole zones 68S in an alternate relationship in a fine pitch in the remaining range of the electrical angle of 120 degrees.

What is claimed is:

1. A single-phase brushless motor, comprising: a magnet rotor having n (n is an integer equal to or greater than 1) north magnetic pole zone or zones having an angular width of 120 or about 120 degrees in electrical angle, n south magnetic pole zone or zones having an angular width of 120 or about 120 degrees in electical angle, and n non-magnetized or substantially non-magnetized zone or zones having an angular width of 120 or about 120 degrees; a stator armature mounted in an opposing relationship to said magnet rotor with an air gap left therebetween, said stator armature including an annular stator yoke, n armature coil or coils for the phase u each including a conductor wound in a troidal configuration and located at an angular same phase position or positions of about u·360 degrees (u is an integer equal to or greater than 1) in electrical angle on said annular stator yoke, n armature coil or coils for the phase v each including a conductor wound in a troidal configuration and located at an angular same phase position or positions on said stator yoke spaced by an angular distance of about v·360+120 degrees (v is an integer equal to or greater than 1) from the position of one of said armature coils for the phase u at the angular position of 360 degrees, and n armature coil or coils for a phase w each including a conductor wound in a troidal configuration and located at an angular same phase position or positions on said stator yoke spaced by an angular distance of about w·360+240 degrees (w is an integer equal to or greater than 1) from the position of the one armature coil for the phase u; a single position detecting element for detecting a magnetic pole of said magnet rotor; and an electric circuit for energizing said armature coils such that when said position detecting element detects one of said north magnetic pole zone or zones of said magnet rotor, and n armature coil or coils for the phase u at the same phase positions are energized over a range of an angle of 120 or about 120 degrees in electrical angle, and when said position detecting element detects one of said south magnetic pole zone or zones of said magnet rotor, said n armature coil or coils for the phase v at the same phase positions are energized over another range of an angle of 120 or about 120 degrees in electrical angle, but when said position detecting element detects one of said non-magnetized or substantially non-magnetized zone or zones or any other non-magnetized portion, said n armature coil or coils for the phase w at the same phase positions are energized over a further range of an angle of 120 or about 120 degrees in electrical angle.

* * * * *